(12) United States Patent
Baeder

(10) Patent No.: US 12,440,986 B2
(45) Date of Patent: Oct. 14, 2025

(54) METHOD AND DEVICE FOR COLLISION AVOIDANCE DURING WORKPIECE PROCESSING BY A MULTI-AXIS PROCESSING MACHINE

(71) Applicant: TRUMPF Werkzeugmaschinen SE + Co. KG, Ditzingen (DE)

(72) Inventor: Siegfried Baeder, Kornwestheim (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 282 days.

(21) Appl. No.: 18/052,213

(22) Filed: Nov. 3, 2022

(65) Prior Publication Data
US 2023/0141971 A1 May 11, 2023

(30) Foreign Application Priority Data
Nov. 9, 2021 (DE) .......................... 102021129148.8

(51) Int. Cl.
*B25J 9/16* (2006.01)
(52) U.S. Cl.
CPC .................................. *B25J 9/1666* (2013.01)
(58) Field of Classification Search
CPC ..................................................... B25J 9/1666
See application file for complete search history.

(56) References Cited

U.S. PATENT DOCUMENTS

| | | | |
|---|---|---|---|
| 10,514,667 B2 | 12/2019 | Okuda | |
| 10,839,317 B2 | 11/2020 | Sato | |
| 12,043,286 B2 * | 7/2024 | Seo | G06F 18/213 |
| 2018/0157226 A1 * | 6/2018 | Okuda | G06N 3/08 |
| 2019/0077019 A1 * | 3/2019 | Hickman | G05D 1/0221 |
| 2019/0202055 A1 * | 7/2019 | Wang | B25J 9/1697 |
| 2019/0278251 A1 * | 9/2019 | Zhi | G05B 19/4061 |
| 2021/0081791 A1 * | 3/2021 | Goodrich | G06N 3/08 |
| 2021/0114209 A1 * | 4/2021 | Wada | B25J 9/161 |
| 2021/0245295 A1 | 8/2021 | Fahrni et al. | |
| 2022/0152826 A1 * | 5/2022 | Danielczuk | G06V 10/82 |
| 2023/0032334 A1 * | 2/2023 | Hane | B25J 9/161 |

(Continued)

FOREIGN PATENT DOCUMENTS

| | | |
|---|---|---|
| DE | 102017128053 A1 | 6/2018 |
| DE | 102018005008 A1 | 1/2019 |

(Continued)

*Primary Examiner* — Mohamad O El Sayah
(74) *Attorney, Agent, or Firm* — LEYDIG, VOIT & MAYER, LTD.

(57) ABSTRACT

A method processes a workpiece using a device. The device has a processing machine configured for three-dimensionally processing the workpiece, and a tool head having a tool. The tool head is movable about at least a first axis and a second axis. The method is carried out by the device. The method includes: capturing input data concerning a contour of the workpiece, a contour of the tool head, a distance between the tool head and the workpiece, the first axis, and the second axis; processing the input data to form feature data; processing the feature data in a machine learning algorithm of the device; and outputting a forecast from the machine learning algorithm regarding a collision of the tool head with the workpiece or some other part of the processing machine.

18 Claims, 5 Drawing Sheets

(56) References Cited

U.S. PATENT DOCUMENTS

| | | | | |
|---|---|---|---|---|
| 2023/0109223 A1* | 4/2023 | Wong | ............... | G06N 3/006 |
| | | | | 700/255 |
| 2023/0195073 A1* | 6/2023 | Sagasaki | ............ | G05B 19/402 |
| | | | | 700/186 |

FOREIGN PATENT DOCUMENTS

| DE | 102018123363 A1 | 3/2020 |
|---|---|---|
| EP | 3786736 A1 | 3/2021 |

* cited by examiner

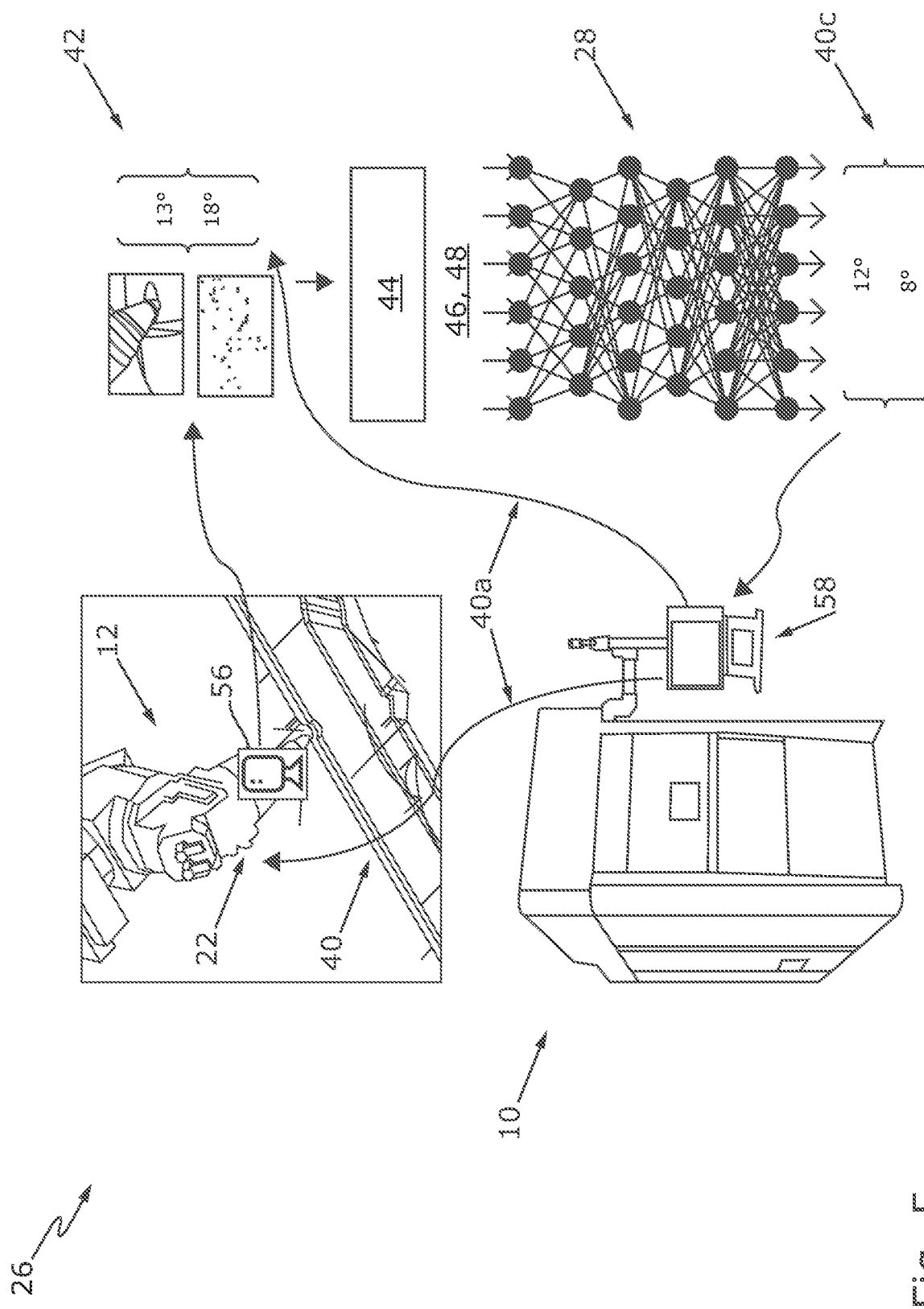

METHOD AND DEVICE FOR COLLISION AVOIDANCE DURING WORKPIECE PROCESSING BY A MULTI-AXIS PROCESSING MACHINE

CROSS REFERENCE TO RELATED APPLICATIONS

This application claims benefit to German Patent Application No. DE 10 2021 129 148.8, filed on Nov. 9, 2021, which is hereby incorporated by reference herein.

FIELD

The present disclosure relates to a method and a device for processing a workpiece.

BACKGROUND

During the three-dimensional processing of a workpiece, in particular during laser cutting or laser welding, collision between one part of a processing machine, in particular a tool head of the processing machine, and a workpiece or another part of the processing machine may occur.

It is known to avoid such collisions by manually checking a processing path. The applicant is furthermore aware of the use of a brute force algorithm for collision avoidance during workpiece processing. However, both methods are complex or require very long computation times.

SUMMARY

In an embodiment, the present disclosure provides a method that processes a workpiece using a device. The device has a processing machine configured for three-dimensionally processing the workpiece, and a tool head having a tool. The tool head is movable about at least a first axis and a second axis. The method is carried out by the device. The method includes: capturing input data concerning a contour of the workpiece, a contour of the tool head, a distance between the tool head and the workpiece, the first axis, and the second axis; processing the input data to form feature data; processing the feature data in a machine learning algorithm of the device; and outputting a forecast from the machine learning algorithm regarding a collision of the tool head with the workpiece or some other part of the processing machine.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5 shows a method for recognizing and avoiding a collision using a sensor;

DETAILED DESCRIPTION

Figure 1:
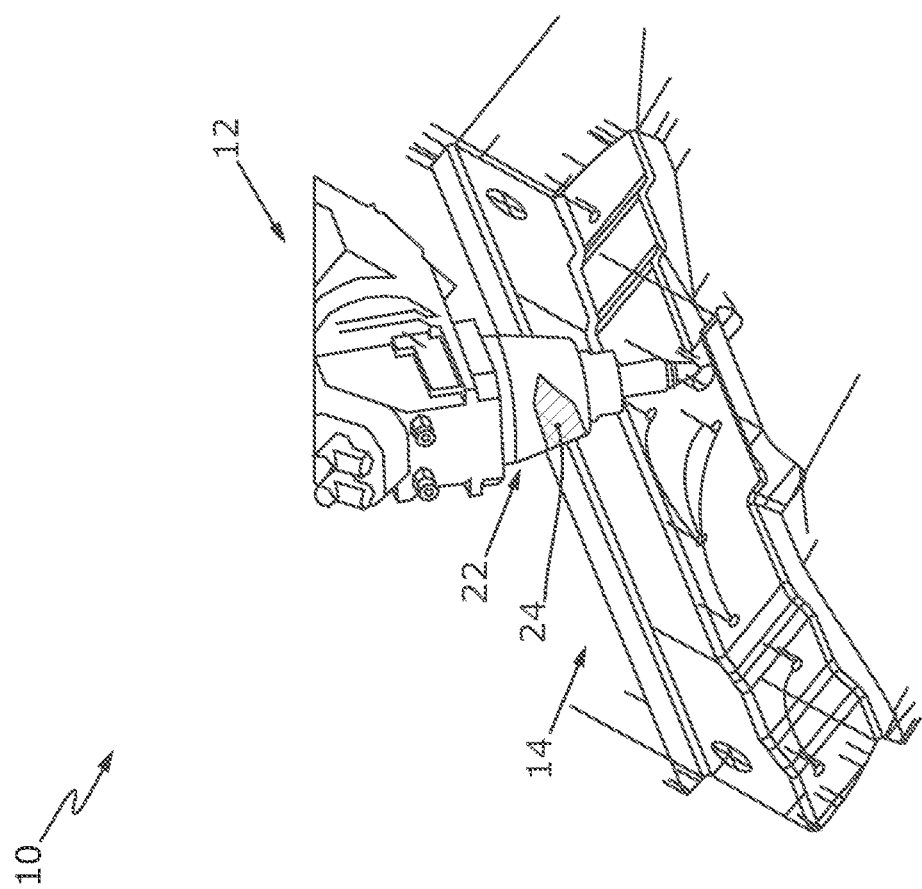
FIG. 1 shows a processing machine having a tool head for processing a workpiece.

Aspects of the present disclosure provide a method and a device which enable collision avoidance in an effective and reliable manner.

According to an aspect of the present disclosure, a method is provided for processing a workpiece using a device, the device comprising a processing machine configured for 3D processing of the workpiece and comprising a tool head, the tool head being movable about a first axis and a second axis, the method being carried out by the device and comprising the following method steps:

B) capturing input data concerning the geometry of the tool head, of the workpiece and of the distance between tool head and workpiece, and also concerning the first axis and concerning the second axis;

C) processing the input data to form feature data;

D) processing the feature data in a machine learning algorithm of the device;

E) outputting a forecast from the machine learning algorithm regarding the collision of the tool head with the workpiece and/or some other part of the processing machine.

The method according to an aspect of the present disclosure enables the reliable and uncomplicated collision avoidance between tool head and workpiece or some other part of the processing machine during the processing of the workpiece along a processing path.

The first axis and the second axis preferably extend through the processing point of the tool on the workpiece. The first axis can be a B-axis of the processing machine. The second axis can be a C-axis of the processing machine.

The distance between the tool head and the workpiece can be determined from a Z-buffer image.

The device can comprise a computer having the machine learning algorithm. The computer can be part of the processing machine.

The processing machine is preferably embodied in the form of a 5- or 6-axis machine. Preferably three axes thereof are provided for moving to a processing point with the tool and two to three axes thereof are provided for setting a working position of the tool head.

The input data are preferably present as a geometry image (black-and-white image, greyscale image, red-green-blue (RGB) image) and/or a Z-buffer image (distance image). The feature data can be present in the form of a feature vector.

The output in method step E) can analogously be effected in the form "will collide", "will collide soon" or "will not collide".

Before method step B), the machine learning algorithm can be trained by inputting verified input data of collisions and/or absent collisions in a method step A). The verified input data can originate from verified forecasts obtained in method step E). Alternatively, the input data can originate from a simulation. The training of the machine learning algorithm constitutes an independent aspect of the present disclosure.

The input data in method step B) can be at least partly taken from computer assisted design (CAD) data or NC data of the processing machine. By way of example, in a simulation the CAD data can be converted into simulated sensor data, in particular simulated camera data.

As an alternative or in addition thereto, the input data can be at least partly taken from sensor data that were recorded by a sensor. The use of the sensor data enables the collision avoidance with significantly reduced computing power for creating or processing the input data. Furthermore, with the use of sensor data, it is also possible to react to unforeseen situations, for example if a holder-which in particular is unknown to the processing machine—is used for clamping the workpiece.

The sensor is particularly preferably arranged or embodied on the tool head. As a result, no or only little further processing of the sensor data is necessary.

In a particularly preferred configuration of an aspect of the present disclosure, the sensor is embodied in the form of a camera. The camera can be embodied in the form of a time-of-flight (TOF) camera or a contour-depth (RGB-D) camera.

In method step E), collision-free input data (values) of the first axis and of the second axis can be output by processing the input data from method step B).

As an alternative thereto, in the case of collision forecast in method step E), the following method steps can be carried out after method step E):

F) varying the input data of the first axis and/or the second axis;
G) carrying out method steps B) to E);
H) carrying out method steps F) and G) until no collision is forecast in method step D) or a predefined number of passes of method steps F) and G) has been reached, in which case, in the absence of collision, the input data of the first axis and second axis used in method step B) are output.

In a particularly preferred configuration of an aspect of the present disclosure, the machine learning algorithm is embodied in the form of a neural network. The neural network can comprise an input layer, a plurality of hidden layers and an output layer. The feature data can be fed to the input layer of the neural network.

The method according to an aspect of the present disclosure is particularly advantageous if the processing machine is embodied in the form of a cutting machine and/or in the form of a laser processing machine. The laser beam of a laser tool of the laser processing machine preferably has the processing point of the tool (here of the laser beam) at its focal point.

According to another aspect of the present disclosure, the device is described here for carrying out the method described here.

Further advantages of the invention are evident from the description and the drawings. Likewise, according to the invention, the features mentioned above and those that will be explained still further may be used in each case individually by themselves or as a plurality in any desired combinations. The embodiments shown and described should not be understood as an exhaustive enumeration, but rather are of exemplary character for outlining the invention.

FIG. 1 shows a device 10 having a processing machine 12 for processing a workpiece 14. The processing machine 12 is embodied in a multi-axis fashion. The processing machine 12 has a first axis 16 and a second axis 18. Three further axes are provided for moving to a processing point 20.

Figure 2:
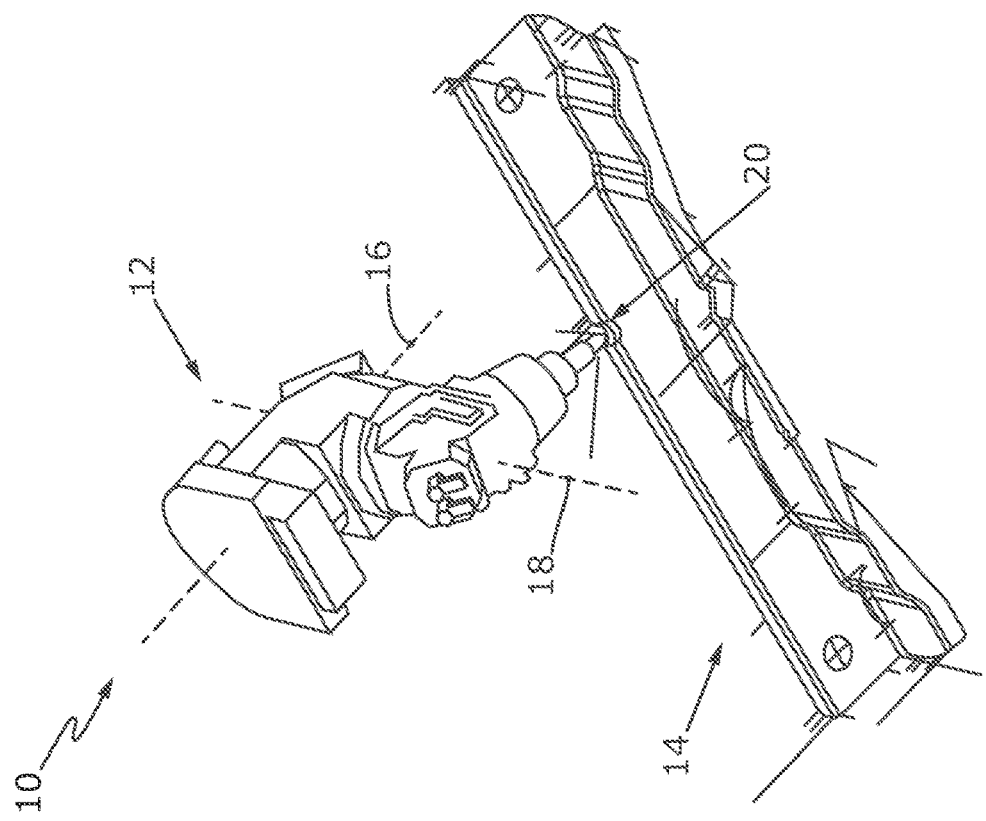
FIG. 2 shows the processing machine from FIG. 1, the tool head colliding with the workpiece during the processing of a specific location of the workpiece.

FIG. 2 likewise shows the device 10. It is evident from FIG. 2 that the processing machine 12 comprises a tool head 22, which collides with the workpiece 14 in a collision region 24. An advantage of implementations according to aspects of the present disclosure is to avoid such collisions in a particularly efficient manner.

Figures 3, 4:
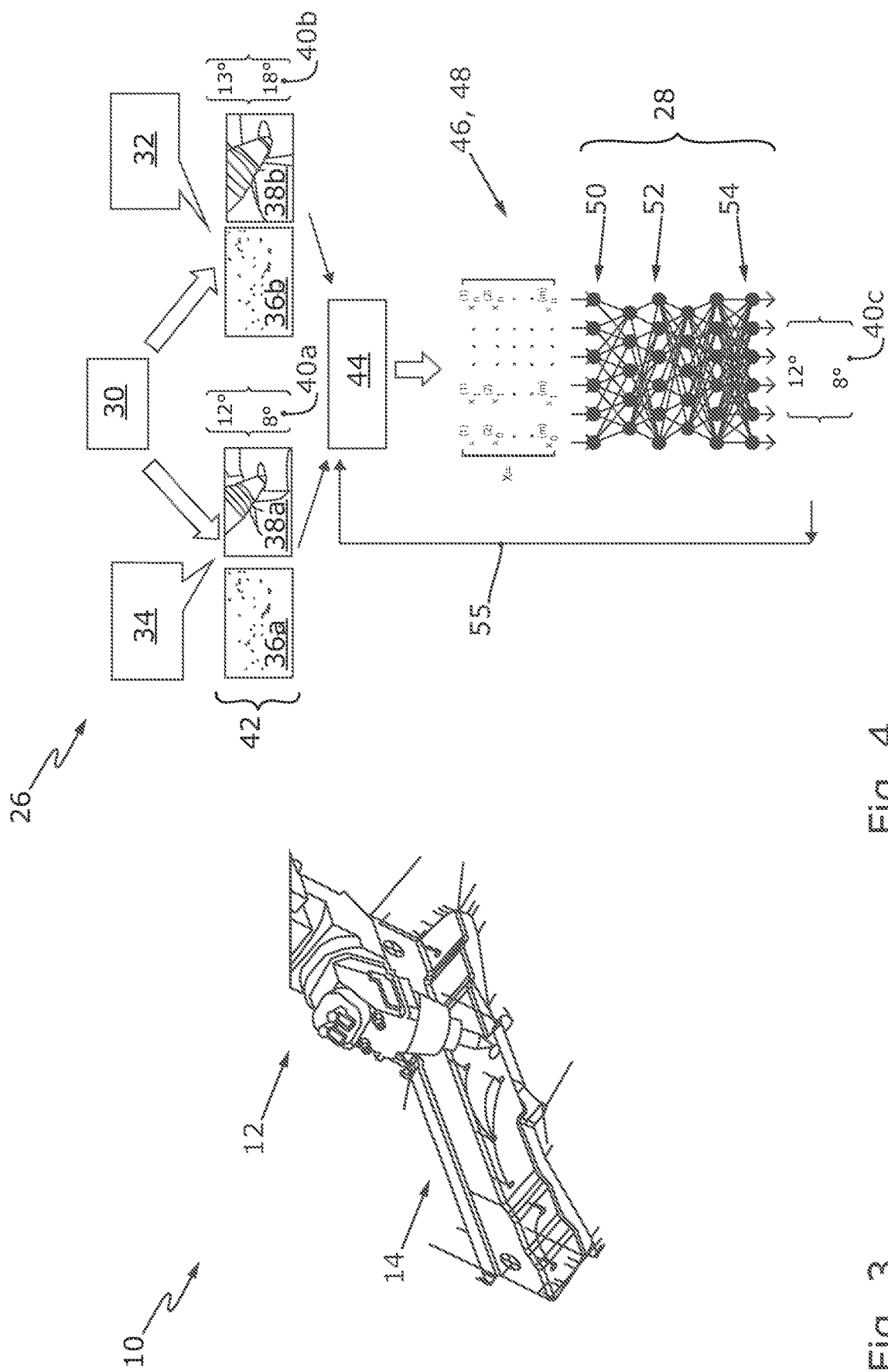
FIG. 3 shows the processing machine from FIG. 2, the tool head not colliding with the workpiece during the processing of the same location as in FIG. 2.
FIG. 4 shows a method for recognizing and avoiding a collision by means of a machine learning algorithm and for training the machine learning algorithm.

FIG. 3 shows the device 10 with the processing machine 12 and the workpiece 14. It is evident from a joint consideration of FIGS. 2 and 3 that in FIG. 3 the same processing of the workpiece 14 is performed, but the collision shown in FIG. 2 is avoided by way of pivoting of the axes 16 and 18 (see FIG. 1).

FIG. 4 shows a method 26 for recognizing and avoiding a collision using a machine learning algorithm 28. In this case, in a simulator 30, CAD data of the workpiece 14 (see FIG. 3) are converted into simulated sensor data. In accordance with the simulation of the workpiece processing, a collision 32 or a resolved collision 34 can arise. A Z-buffer image (distance image) 36a, 36b, a geometry image 38a, 38b and the associated values 40a, 40b of the axes 16, 18 (see FIG. 1) can be present for each of these scenarios. These input data 42 (see also FIGS. 6a-c) are processed to form feature data 46, here in the form of a feature vector 48, in an extraction unit 44.

The feature vector 48 is input into the machine learning algorithm 28, here in the form of a neural network. In particular, the feature vector 48 is transferred to an input layer 50 and processed by hidden layers 52. An output layer 54 outputs collision-free values 40c of the axes 16, 18 (see FIG. 1).

For the purpose of training the machine learning algorithm 28, these values 40c can be verified and fed back as feedback 55.

FIG. 5 shows a method 26 wherein the input data 42 are at least partly generated by a sensor 56, here in the form of a camera. The sensor 56 can be arranged on the tool head 22 of the processing machine 12. Particularly preferably, the sensor 56 is arranged at the same position at which a virtual sensor was situated when data for training the machine learning algorithm 28 were generated by way of a simulation.

In this case, the device 10 comprises a controller 58, which firstly predefines the values 40a of the first axis 16 and/or second axis 18 (see FIG. 1). From the input data 42, in the extraction unit 44, the feature data 46 or the feature vector 48 are/is generated and transferred to the machine learning algorithm 28, which outputs collision-free values 40c. These collision-free values 40c can be transferred to the controller 58 in order to correct the processing path of the workpiece 14, if appropriate.

Figure 6A:
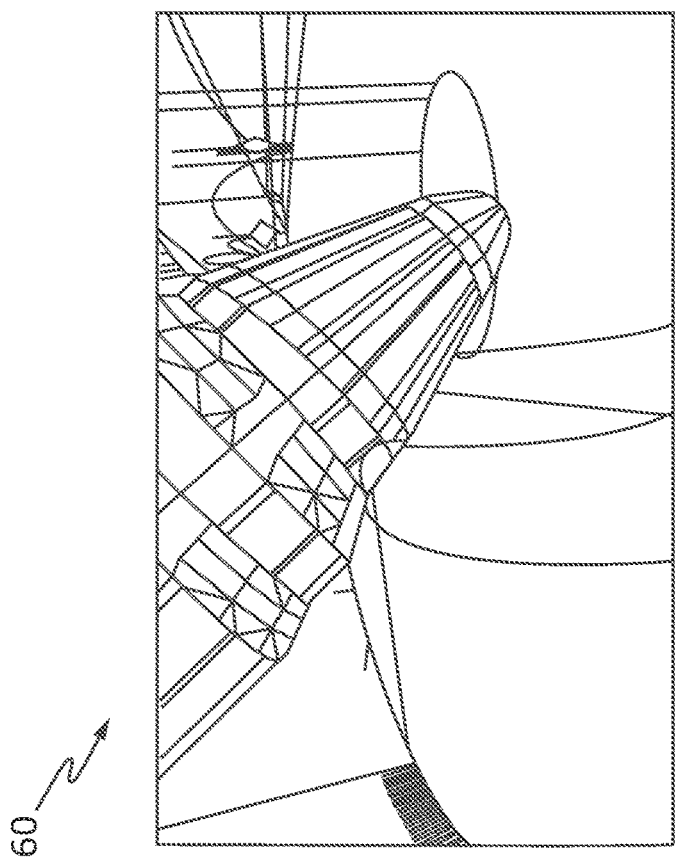
FIG. 6a shows a close-up view of a collision between a tool head and a workpiece.

FIG. 6a shows a close-up view of a geometry image 38c with a collision region 24.

Figure 6B:
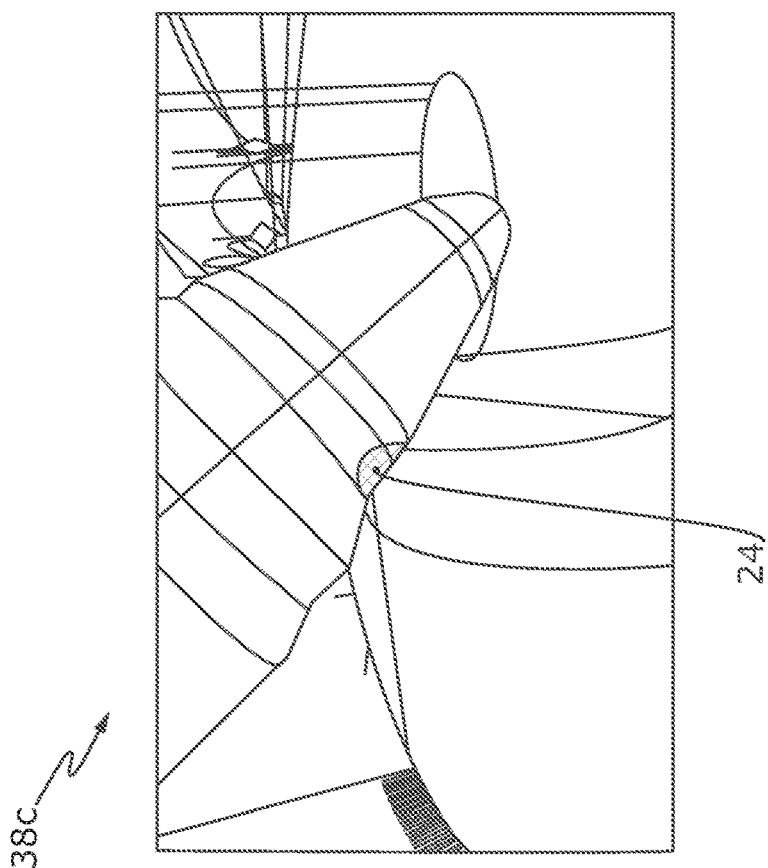
FIG. 6b shows an edge image of the situation in accordance with FIG. 6a, and FIG. 6c shows a filtered Z-buffer image of the situation in accordance with FIG. 6b.

FIG. 6b shows the geometry image 38c from FIG. 6a as an edge image 60.

Figure 6C:

FIG. 6c shows the edge image 60 in accordance with FIG. 6b as a filtered Z-buffer image 36c.

The representations 38c, 60 and/or 36c can be used for determining a collision, the Z-buffer image 36 being particularly well suited to processing by the machine learning algorithm 28 (see FIGS. 4 and 5).

With all figures of the drawing being jointly taken into consideration, aspects of the present disclosure relates to a method 26 and a device 10 for avoiding collisions between a part of a processing machine 12 and a workpiece 14 processed by the processing machine 12. This involves simulating distances between at least one part of the processing machine 12 and the workpiece 14 in the case of the values 40a, b of at least a first axis 16 and a second axis 18 of the processing machine 12 during workpiece processing, and/or measuring them by means of a sensor 56. These input data 42 are preferably processed to form a feature vector 48 and fed to a trained machine learning algorithm 28. The machine learning algorithm 28 determines collision-free values 40c of the axes 16, 18 depending on the feature vector 48. These values 40c, after being verified, can be fed to the machine learning algorithm 28 as feedback 54 indirectly or directly for the training of the machine learning algorithm 28.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Device
12 Processing machine
14 Workpiece
16 First axis
18 Second axis
20 Processing point
22 Tool head
24 Collision region
26 Method
28 Machine learning algorithm
30 Simulator
32 Collision
34 Resolved collision
36a-c Z-buffer image
38a-c Geometry image
40a-c Values of the first axis 16 and/or second axis 18
42 Input data
44 Extraction unit
46 Feature data
48 Feature vector
50 Input layer
52 Hidden layers
54 Output layer
55 Feedback
56 Sensor
58 Controller
60 Edge image

The invention claimed is:

1. A method for processing a workpiece using a device, the device comprising a processing machine configured for three-dimensionally processing the workpiece and the device further comprising a tool head having a tool, the tool head being movable about at least a first axis and a second axis, the method being carried out by the device, the method comprising:
   B) capturing input data concerning a contour of the workpiece, concerning a contour of the tool head, concerning a distance between the tool head and the workpiece, concerning the first axis, and concerning the second axis;
   C) processing the input data to form feature data;
   D) processing the feature data in a machine learning algorithm of the device;
   E) outputting a forecast from the machine learning algorithm regarding a collision of the tool head with the workpiece or some other part of the processing machine, wherein, in a case of a collision forecast in the method step E), collision-free input data of the first axis and second axis are output in the method step E), wherein the collision-free input data corresponds to a pivoting of the first axis and the second axis.

2. The method according to claim 1, the method further comprising the following method step carried out before the method step B):
   A) training the machine learning algorithm by inputting verified input data of collisions or absent collisions of the tool head.

3. The method according to claim 2, the method further comprising obtaining the verified input data of collisions or absent collisions of the tool head from previously executed and verified forecasts determined by the machine learning algorithm or from a simulation.

4. The method according to claim 1, wherein the input data in method step B) are at least partly taken from computer assisted design (CAD) data.

5. The method according to claim 4, wherein the input data taken from computer assisted design (CAD) data comprises simulated camera data.

6. The method according to claim 1, wherein the input data in method step B) are at least partly taken from sensor data of a sensor.

7. The method according to claim 6, wherein the sensor is installed on the tool head.

8. The method according to claim 6, wherein the sensor is a camera.

9. The method according to claim 8, wherein the camera is a time-of-fight camera or a contour-depth camera.

10. The method according to claim 1, wherein, in a case of a collision forecast in the method step E), the following method steps are carried out after the method step E):
    F) varying values of the first axis or of the second axis in the input data:
    G) carrying out the method steps B) to E):
    H) carrying out the method steps F) and G) until no collision is forecast in the method step E) or a predefined number of passes of the method steps F) and G) has been reached, in which case, in an absence of a collision, the values of the input data of the first axis and second axis used in method step B) are output.

11. The method according to claim 1, wherein the machine learning algorithm is a neural network.

12. The method according to claim 1, wherein the processing machine is a cutting machine or a laser processing machine.

13. The device for carrying out the method according to claim 1.

14. A method for processing a workpiece using a device, the device comprising a processing machine configured for three-dimensionally processing the workpiece and the device further comprising a tool head having a tool, the tool head being movable about at least a first axis and a second axis, the method being carried out by the device, the method comprising
- B) capturing input data concerning a contour of the workpiece, concerning a contour of the tool head, concerning a distance between the tool head and the workpiece, concerning the first axis, and concerning the second axis;
- C) processing the input data to form feature data;
- D) processing the feature data in a machine learning algorithm of the device;
- E) outputting a forecast from the machine learning algorithm regarding a collision of the tool head with the workpiece or some other part of the processing machine, wherein, in a case of a collision forecast in the method step E), the following method steps are carried out after the method step E)
- F) varying values of the first axis or of the second axis in the input data, the varying of the values corresponding to a pivoting of the first axis or the second axis;
- G) carrying out the method steps B) to E);
- H) carrying out the method steps F) and G) until no collision is forecast in the method step E) or a predefined number of passes of the method steps F) and G) has been reached, in which case, in an absence of a collision, the values of the input data of the first axis and second axis used in method step B) are output.

15. The method according to claim 12, wherein the processing machine is a 5- or 6-axis machine, wherein three axes of the processing machine are configured for moving to a processing point with the tool, and at least two axes of the processing machine are configured for setting a working position of the tool head, wherein the tool is a laser tool.

16. The method according to claim 12, wherein the input data comprises a geometry image or a Z-buffer image, and wherein feature data comprises a feature vector.

17. The method according to claim 12, wherein the collision forecast output from the method step E corresponds to a determination that the tool will collied or will collide soon with the workpiece or some other part of the processing machine.

18. A device for processing a workpiece, the device comprising
- a processing machine configured for three-dimensionally processing the workpiece;
- a tool head having a tool, the tool head being movable about at least a first axis and a second axis; and
- a controller configured to operate the device to carry out a method, the method comprising
    - B) capturing input data concerning a contour of the workpiece, concerning a contour of the tool head, concerning a distance between the tool head and the workpiece, concerning the first axis, and concerning the second axis;
    - C) processing the input data to form feature data;
    - D) processing the feature data in a machine learning algorithm of the device;
    - E) outputting a forecast from the machine learning algorithm regarding a collision of the tool head with the workpiece or some other part of the processing machine, wherein, in a case of a collision forecast in the method step E), collision-free input data of the first axis and second axis are output in the method step E), wherein the collision-free input data corresponds to a pivoting of the first axis and the second axis.

* * * * *